(12) United States Patent
Chen et al.

(10) Patent No.: US 7,180,208 B2
(45) Date of Patent: Feb. 20, 2007

(54) SWITCH STRUCTURE FOR REDUCED VOLTAGE FLUCTUATION IN POWER DOMAINS AND SUB-DOMAINS

(75) Inventors: Wei Chen, Plano, TX (US); Hugh Mair, Dallas, TX (US); Uming Ko, Dallas, TX (US); David Scott, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 458 days.

(21) Appl. No.: 10/735,943

(22) Filed: Dec. 15, 2003

(65) Prior Publication Data

US 2005/0146228 A1 Jul. 7, 2005

(51) Int. Cl.
*H01H 35/00* (2006.01)
*H02B 1/24* (2006.01)

(52) U.S. Cl. ...................................................... 307/116
(58) Field of Classification Search .................. 307/116
See application file for complete search history.

(56) References Cited

U.S. PATENT DOCUMENTS 2,524,035 A * 10/1950 Brattain et al. ............. 330/250
5,428,523 A * 6/1995 McDonnal ................... 363/71
5,672,958 A * 9/1997 Brown et al. ................ 323/269

* cited by examiner

*Primary Examiner*—Burton S. Mullins
*Assistant Examiner*—Adi Amrany
(74) *Attorney, Agent, or Firm*—Ronald O. Neerings; W. James Brady III; Frederick J. Telecky, Jr.

(57) ABSTRACT

System and method for reducing voltage fluctuations in an integrated circuit with multiple power domains and sub-domains. A preferred embodiment comprises a plurality of voltage sources and a switching network (such as switching network 320) wherein outputs from the plurality of voltage sources are inputs. The switching network can couple the outputs of voltage sources (based on a mapping) with the same output voltage levels to reduce voltage fluctuation amongst power domains coupled to the coupled outputs. The coupling may be performed by a switching structure (such as the switching structure 215) that can controllably electrically couple two outputs.

25 Claims, 9 Drawing Sheets

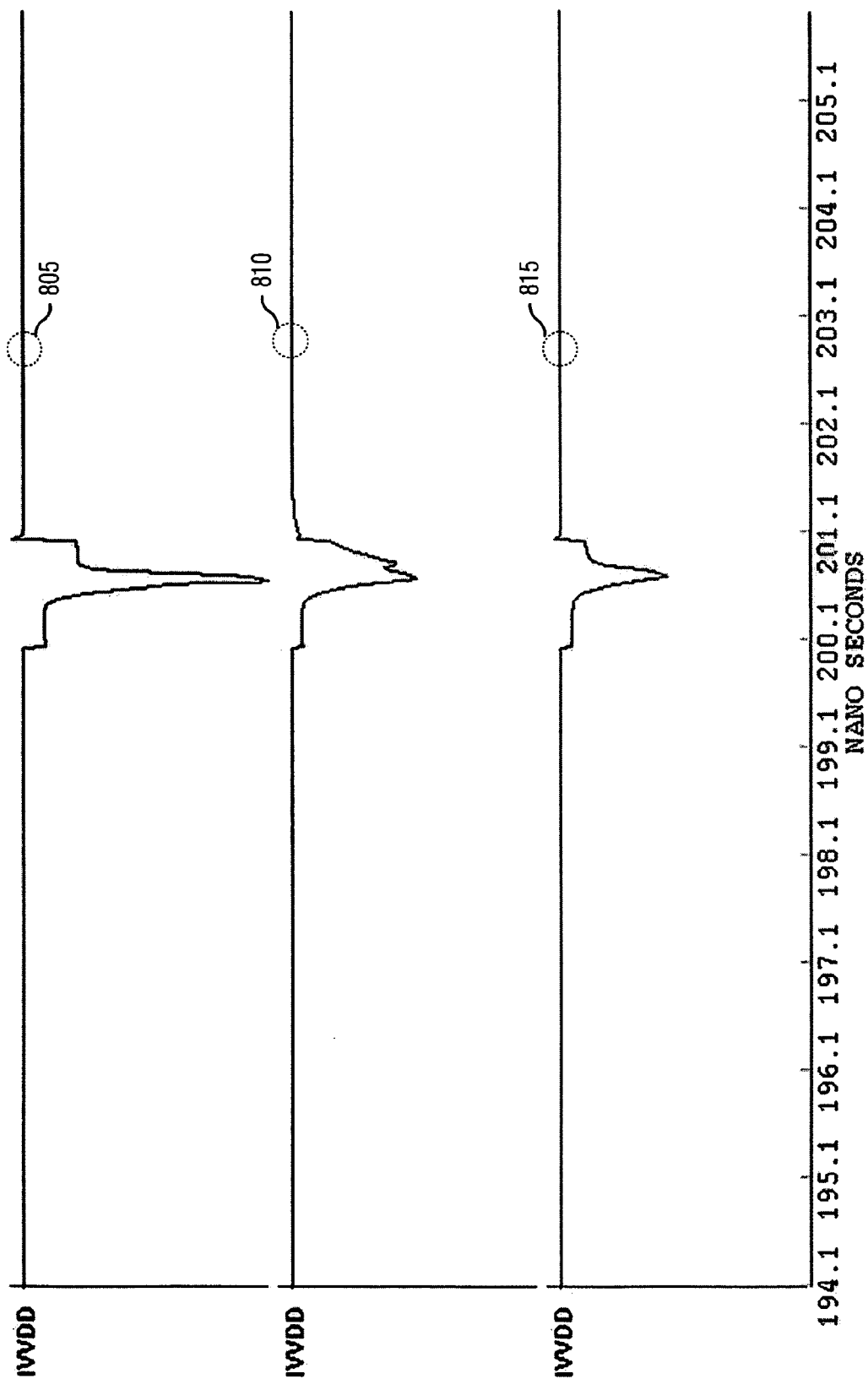

SWITCH STRUCTURE FOR REDUCED VOLTAGE FLUCTUATION IN POWER DOMAINS AND SUB-DOMAINS

TECHNICAL FIELD

The present invention relates generally to integrated circuits, and more particularly to a system for providing reduced voltage fluctuations in an integrated circuit with multiple power domains.

BACKGROUND

In many applications, such as wireless devices and small digital equipment, an entire system can be integrated onto a single integrated circuit (IC). These ICs are commonly referred to as system-on-a-chip (SOC). SOCs usually offer several advantages over a similar design with a large number of discrete components in their reduced cost (due to a reduction in parts count), reduced power consumption, and reduced size.

Because in a SOC an entire system may be integrated onto the IC, multiple power domains may be needed to satisfy the power requirements. Each of the power domains may have different (or the same) voltage requirements. For the power domains that may have different voltage requirements, different power supplies may be used to provide the needed power.

A commonly used solution for power domains that have the same voltage requirements is to use multiple power supplies which may be designed identically to provide power to each of the power domains. This solution permits the use of multiple and relatively simple power supplies. The simple power supplies can be easier to design and be smaller, and hence easier to integrate onto the IC.

Another solution for providing a voltage to multiple power domains with the same voltage requirements is to use a single power supply that can provide the needed voltage to each of the multiple power domains. The use of a single power supply can simply the design and integration onto the IC since only a single power supply needs to be designed and integrated. Furthermore, a single power supply source may be able to offer better power supply noise immunity than multiple independent power supply sources.

One disadvantage of the prior art is that the use of multiple identical power supplies to provide the needed power to each of the power domains with the same voltage requirements is that since the power supplies are independent, there can be fluctuation in the voltages provided by the power supplies, even though the power supplies are designed to be identical.

Voltage fluctuations may lead to problems in the proper operation of clock circuits (typically seen as clock skew) and localized voltage fluctuations may lead to circuit delay and slew rate that may be outside of expected values. Voltage fluctuation may even result in the functional failure of circuitry in the integrated circuit and the integrated circuit itself.

A second disadvantage of the prior art is that the use of a single power supply to provide the needed power to each of the power domains with the same voltage requirements is that the power supply will necessarily need to be large enough to provide sufficient current. A large power supply may be hard to integrate into an IC due to its size.

SUMMARY OF THE INVENTION

These and other problems are generally solved or circumvented, and technical advantages are generally achieved, by preferred embodiments of the present invention which provides for a system for reducing voltage fluctuation in an integrated circuit with multiple power domains.

In accordance with a preferred embodiment of the present invention, a circuit comprising two voltage sources, and a switching structure having a first terminal coupled to an output of a first voltage source and a second terminal coupled to an output of a second voltage source, the switching structure containing circuitry to electrically couple the outputs together based on a value on a control signal line is provided.

In accordance with another preferred embodiment of the present invention, a circuit comprising M voltage sources, wherein M is an integer number greater than two (2), and a switching network having M terminals, wherein each terminal is coupled to an output from one of the M voltage sources, the switching network containing circuitry to electrically couple the outputs of the M voltage sources, wherein the coupling of the outputs is based on a mapping is provided.

In accordance with another preferred embodiment of the present invention, an integrated circuit comprising a circuitry block, a plurality of power supplies, each coupled to the circuitry block, each power supply comprising, M voltage sources, wherein M is an integer number greater than one (1), and a switching network having M terminals, wherein each terminal is coupled to an output from one of the M voltage sources, the switching network containing circuitry to electrically couple the outputs of the M voltage sources, wherein the coupling of the outputs is based on a mapping is provided.

An advantage of a preferred embodiment of the present invention is that power domains with the same voltage requirements may be coupled together to reduce voltage fluctuations in the voltages provided to the power domains.

A further advantage of a preferred embodiment of the present invention is that power domains with the same voltage requirements may be decoupled to provide a measure of independence and to permit the separation of the power domains to allow for testing.

Yet another advantage of a preferred embodiment of the present invention is that it provides for flexibility in selecting which power domains to couple together and which power domains to decouple instead of coupling or decoupling all of the power domains.

Yet another advantage of a preferred embodiment of the present invention is that the present invention does not incur any additional layout overhead when compared to existing designs for power supplies for multiple domains. Therefore, integrating the present invention does not require increasing the overall size of the SOC.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is a data plot of switching-on current, showing current spike reduction with use of the switching structure, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an implementation of a complete system onto an integrated circuit with a need for multiple power domains and power sub-domains, wherein some of the power domains (and power sub-domains) have the same voltage requirements. The invention may also be applied, however, to other implementations of circuitry onto an integrated circuit wherein there is a need for flexibility in providing power to the circuitry, whether the integrated circuit contains a complete system or a partial system.

Figure 1:
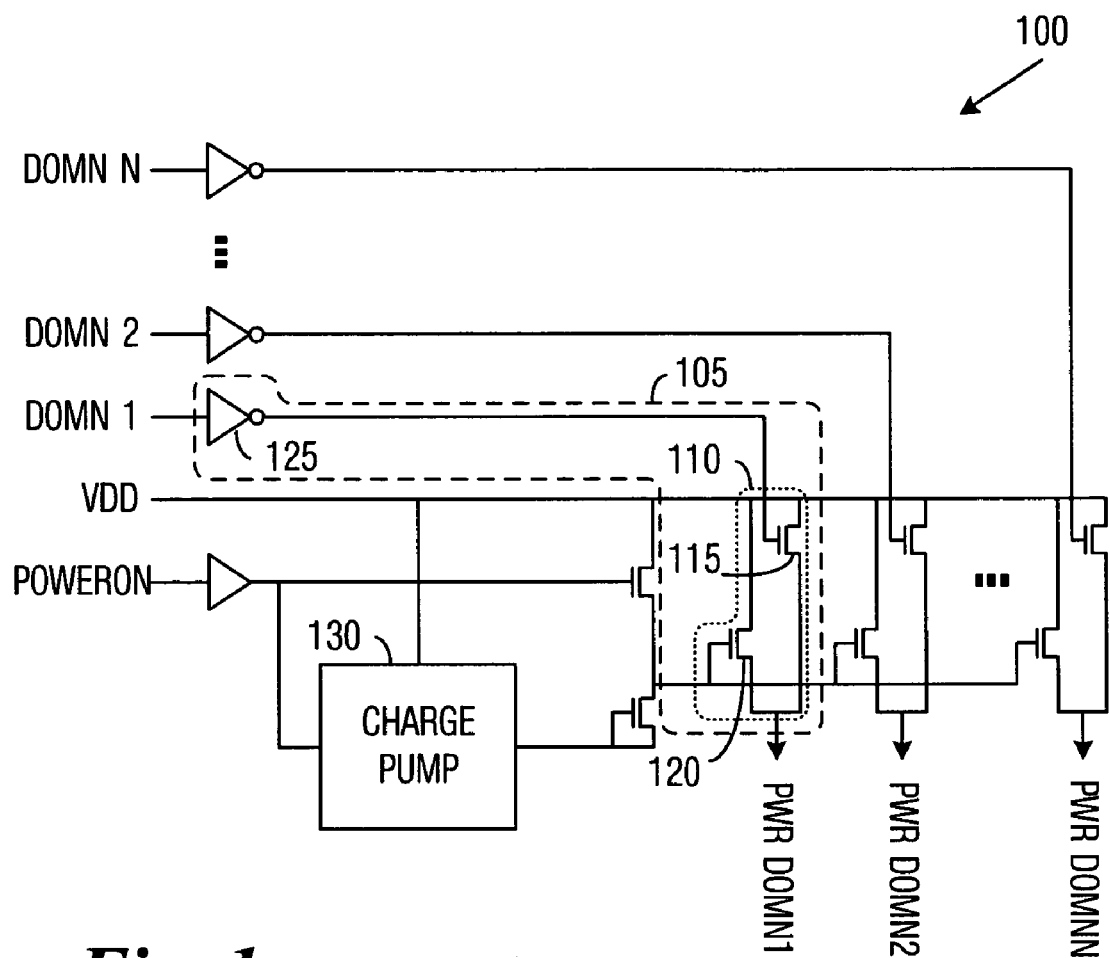
FIG. 1 is a diagram of a prior art design for a circuit to provide a voltage to multiple power domains (or power sub-domains)

With reference now to FIG. 1, there is shown a diagram illustrating a prior art design for a circuit 100 that can be used to provide a voltage to multiple power domains (or power sub-domains), wherein the same voltage level is provided to each power domain. As shown in FIG. 1, the circuit includes a plurality of power domain power sources, such as power domain power source 105 for power domain 1. If the circuit 100 is to provide a voltage for N power domains, then there will be N power domain power sources.

A power domain power source, such as power domain power source 105, may include a power supply 110 and an inverting buffer 125. The power domain power source 105 may be controlled by a control signal (labeled "DOMN 1" in FIG. 1) which can be used to regulate whether or not the power domain power source 105 is providing power to the power domain. Note that the inverting buffer 125 may be a necessity depending upon the nature of a control signal and/or the type of power supply 110.

The power supply 110 includes a pair of transistors 115 and 120. Both of the transistors 115 and 120 couple the power domain to a power rail "VDD." However, the transistor 115 is controlled by the control signal "DOMN 1" and is to be used when the power domain is to be powered by the power domain power source 105. The transistor 120 is controlled by a signal produced by a charge pump 130 and is to be used to support testing, such as Iddq testing. Note that if the power domain power source 105 does not need to support testing, then the transistor 120 and the charge pump 130 need not be present.

Although each of the power domain power sources and their attendant power supplies may be coupled to the same power rail "VDD," the power supplied to the different power domains may suffer from voltage fluctuations. This may be due to the relative independence of each of the power domain power sources and their power supplies, differences in the transistors in the power supplies, and so forth.

Figure 2A:
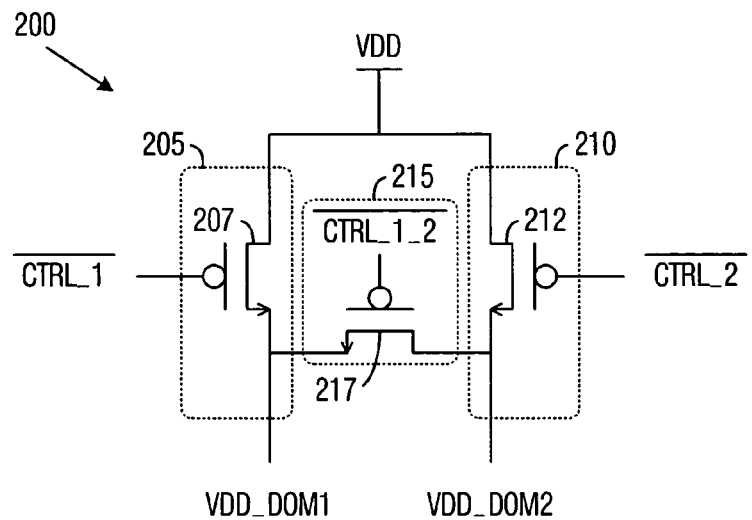
FIGS. 2a through 2d are diagrams of circuits to provide power to two power domains (or power sub-domains) with reduced voltage fluctuations along with their logical representations, according to a preferred embodiment of the present invention.

With reference now to FIG. 2a, there is shown a diagram illustrating a circuit 200 for providing power to two power domains (or power sub-domains) with reduced voltage fluctuations, according to a preferred embodiment of the present invention. As illustrated in FIG. 2, the circuit 200 features two power domain power sources 205 and 210. In addition to being used to reduce voltage fluctuations in power domains, the circuit 200 may also be used to reduce voltage fluctuations in power sub-domains. A single power domain may be made up of a plurality of power sub-domains. Power sub-domains can be used to separate power delivery to different circuits within a single power domain. Power sub-domains, by definition, have common voltage requirements.

Note that power domain power sources 205 and 210, as displayed in FIG. 2, may have power supplies (VDD) with a single transistor (transistors 207 and 212) each. As such, the power domain power sources 205 and 210 may not support testing, such as Iddq testing like the power domain power sources illustrated in FIG. 1. However, the power domain power sources 205 and 210 may be readily modified to support such forms of testing without affecting the present invention. Each power domain power source may be controlled by a control signal, "CTRL_1" for power domain power source 205 and "CTRL_2" for power domain power source 210. As displayed in FIG. 2, the control signals may be active low signals.

A switch structure 215 may be used to couple the two power domain power sources 205 and 210 together. The switch structure 215 can couple outputs from the two power domain power sources 205 and 210 together to help ensure that the voltage provided to the two power domains are the same. The switch structure 215 may be made from a single transistor 217, with the transistor's gate coupled to the output of one of the power domain power sources and the transistor's drain coupled to the output of the other power domain power source. The switch structure 215 may be controlled by a control signal, "CTRL_1_2." The control signal may be used to couple/decouple the outputs of the two power domain power sources. As in the control signals for the power domain power sources, the control signal "CTRL_1_2" may be an active low signal. For example, if the control signal closes the switch (the transistor 217) in the switch structure 215, then the outputs may be coupled and if the control signal opens the switch, then the outputs may be decoupled.

According to a preferred embodiment of the present invention, the control signal "CTRL_1_2" may be an external signal, which can be provided outside of the circuit 200. Alternatively, the control signal "CTRL_1_2" may be logically derived from other control signals. For example, the control signal "CTRL_1_2" may be the logical AND of the control signals "CTRL_1" and "CTRL_2." Therefore, if both the power domain power sources 205 and 210 are on (therefore control signals "CTRL_1" and "CTRL_2" are on), then the control signal "CTRL_1_2" may be on to couple the outputs of the two power domain power sources together. If, one or both of the power domain power sources 205 and 210 is off, then the control signal "CTRL_1_2" may then be off to decouple the outputs of the two power domain power sources. Note that the control signal "CTRL_1_2" may be derived from the control signals "CTRL_1" and "CTRL_2" using other logical expressions without changing the spirit of the present invention.

As shown in FIG. 2, the switching structure 215 may be constructed out of a transistor, namely a P-type MOSFET (metal oxide semiconductor field-effect transistor). However, other types of transistors, such as an N-type MOSFET can be used to build the switching structure 215. For non-integrated solutions, it is possible to use other forms of switches, such as relays and simple switches, to implement the switching structure. In situations wherein leakage may be a concern, the switching structure 215 (and perhaps the transistors 207 and 212) may be made out of thick oxide which may result in slow transistors with low leakage.

Furthermore, the transistors 207 and 212, used to control the flow of the current from the power source VDD, may be approximately the same size (length, width, and cross-section) while the transistor in the switching structure 215 may have a width that can be as small as 10 to 20 percent of the width of the two transistors 207 and 212. This can be due to the fact that the transistor in the switching structure 215 may not have to handle as much current as the transistors 207 and 212 and need to only be sized accordingly.

Note that the design of the circuit 200 can be readily extended for use in power sub-domains. The circuit 200 shown in FIG. 2 can be used in a power sub-domain since within a power sub-domain, the voltage requirements across the power sub-domains may be constant. Additionally, each power sub-domain may be independently turned on and off. For the case when power sub-domains are on, their respective outputs may be coupled together to reduce voltage fluctuation.

Figure 2B:
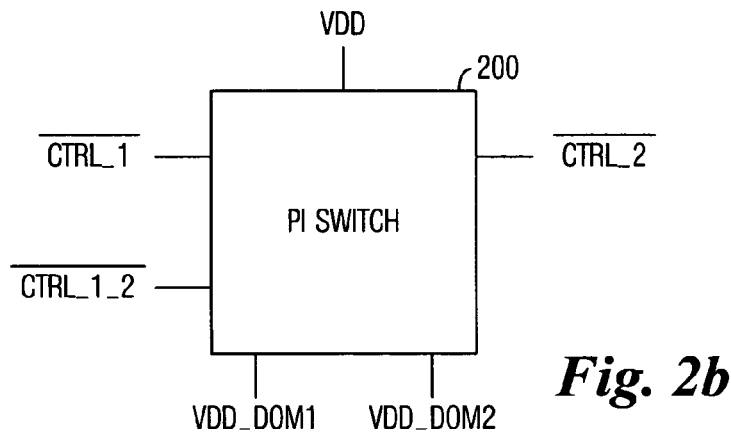

With reference now to FIG. 2b, there is shown a diagram illustrating a logical representation of the circuit 200 displayed in FIG. 2a, according to a preferred embodiment of the present invention. As discussed above, the circuit 200 can have three control signals (CTRL_1, CTRL_2, and CTRL_1_2), a power input (VDD), and two outputs (VDD_DOM 1 and VDD_DOM 2). The logical representation of the circuit 200 can be referred to as a pi switch.

Figure 2C:
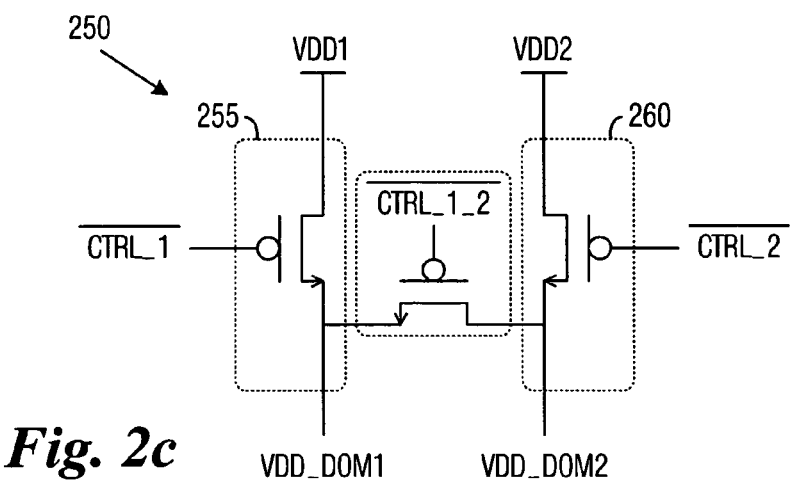
Figure 2D:
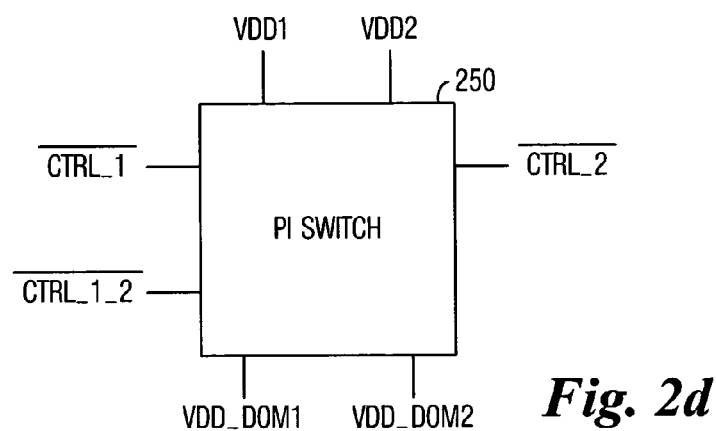

With reference now to FIG. 2c, there is shown a diagram illustrating a circuit 250 for providing power to two power domains (or power sub-domains) with reduced voltage fluctuations, wherein the circuit may be powered by separate power inputs, according to a preferred embodiment of the present invention. The circuit 200 is powered by a single power input that is shared by the two power domain power sources 205 and 210. However, in certain situations, it may be preferred (or required) that the power domain power sources be powered by separate power sources. In the circuit 250, two power domain power sources 255 and 260 may be powered by separate power sources, VDD1 and VDD2, respectively. Note that even with separated power sources, the circuit 250 may operate in a manner that is consistent with the circuit 200. FIG. 2d is a diagram illustrating a logical representation of the circuit 250.

Figure 3:
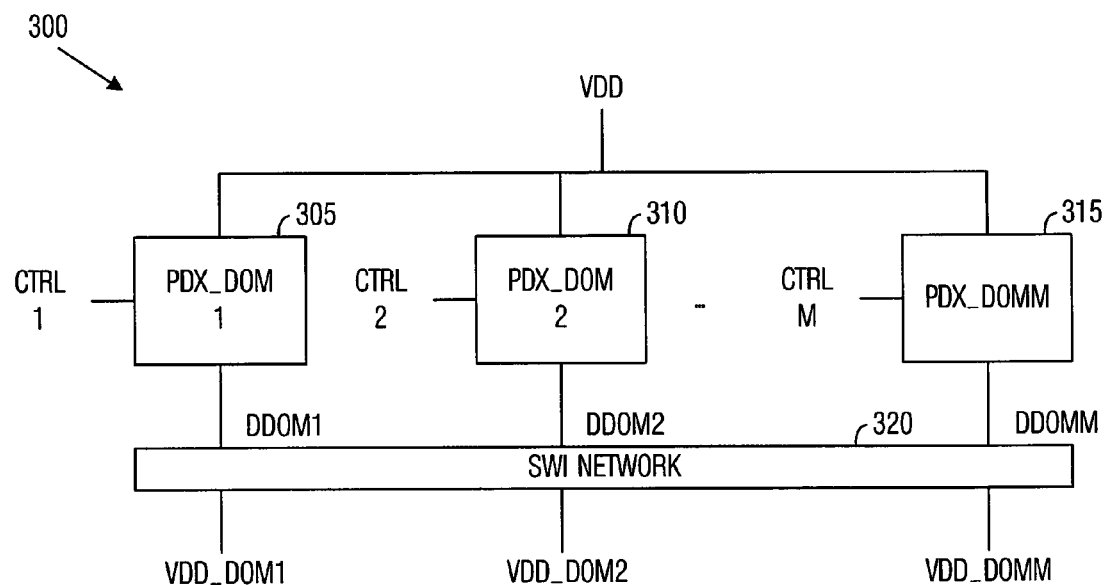
FIG. 3 is a diagram of a circuit for providing power to a plurality of power domains (or power sub-domains) with reduced voltage fluctuations, according to a preferred embodiment of the present invention.

With reference now to FIG. 3, there is shown a diagram illustrating a circuit 300 for providing power to a plurality of power domains (or power sub-domain) with reduced voltage fluctuations, according to a preferred embodiment of the present invention. The circuit 300 features M power domain power sources (boxes labeled PDX_DOM 1 305 through PDX_DOM M 315), wherein each of the power domains may be provided with power at the same voltage level. Each of the power domain power sources can be controlled by a control signal, for example, power domain power source PDX_DOM 1 305 can be controlled by a control signal "CTRL_1." The power domain power sources may be similar in design to those displayed in FIGS. 1 and 2.

Outputs from the power domain power sources may be coupled to a switch network 320. The switch network 320 may be thought of as an extension of the switch structure 215 (FIG. 2). The switch network 320 may couple all or none or a subset of the outputs of the power domain power sources together to provide power to the various power domains with reduced power fluctuations. According to a preferred embodiment of the present invention, the connectivity of the switch network 320 may be dependent upon the desired complexity of the circuit 300. For example, the switch network 320 may be relatively simple if the circuit 300 supports only either fully decoupled power domains or fully coupled power domains. The switch network's complexity may increase should the circuit 300 support the coupling of subsets of power domains in addition to fully coupled and fully decoupled.

The coupling of the outputs from the power domain power sources by the switch network 320 can be expressed as a mapping of the inputs to the switch network 320 (the outputs of the power domain power sources) to the outputs of the switch network 320 (the power domains). The mapping may be simple, i.e., couple all of the outputs of the power domain power sources together or couple none of the outputs of the power domain power sources. The mapping may be complex, i.e., couple the outputs of power domain power sources 1, 2, and 3 together, do not couple the output of power domain power source 4 to anything, and couple the outputs of the power domain power sources 5 and 6 together. The mapping may be predetermined during the design of the switching network 320 and stored in a memory (not shown). Alternatively, the mapping may be determined dynamically and provided to the switching network 320 after being determined.

Figure 4A:
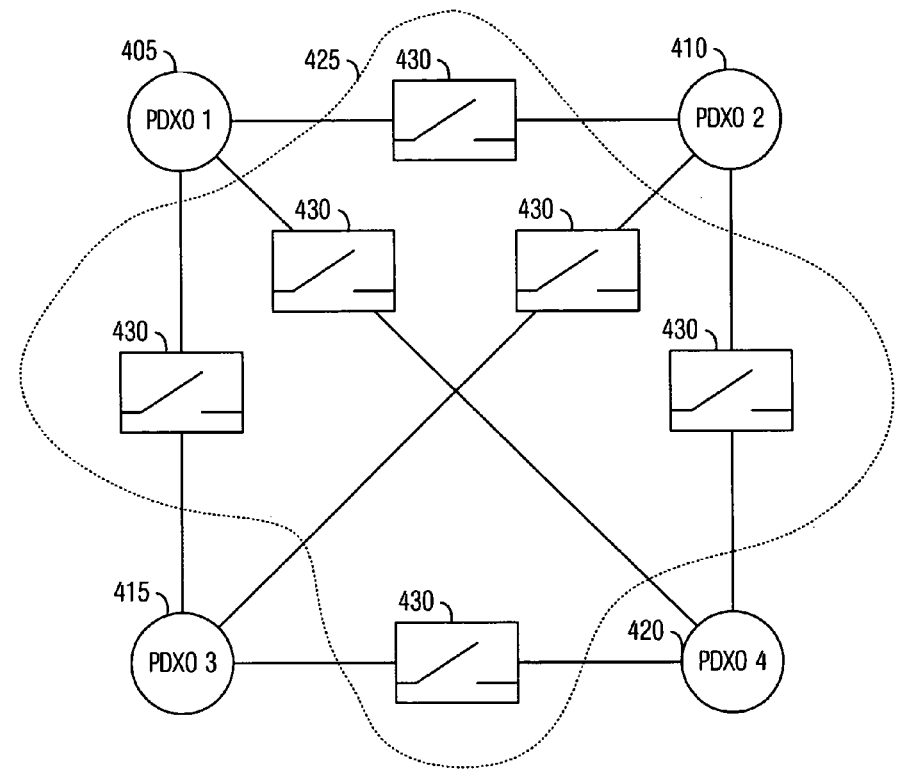
FIG. 4a is a diagram of a switching network for four power domain (or power sub-domain) power supplies, wherein the four domain power supplies can be fully connected, according to a preferred embodiment of the present invention.

With reference now to FIG. 4a, there is shown a diagram illustrating a switch network 425 for four power domain (or power sub-domain) power supplies, wherein the four power domain power supplies can be fully connected, according to a preferred embodiment of the present invention. The switch network 425 can be used to couple outputs from the four power domain power sources (displayed in FIG. 4 as "PDXO 1" 405, "PDXO 2" 410, "PDXO 3" 415, and "PDXO 4" 420). The switch network 425 may be an example of the switch network 320 (FIG. 3) for a situation wherein there are four power domain power supplies. As illustrated in FIG. 4, the switch network 425 may permit the coupling of an output of any power domain power supply to any combination of outputs of the remaining power domain power supplies. For example, output "PDXO 1" 405 may be coupled to output "PDXO 2" 410 and output "PDXO 4" 420 but not to output "PDXO 3" 415.

The switch network 425 may be constructed out of a plurality of switch structures 430, wherein each switch structure 430 may be similar in design to circuit 200 (FIG. 2a) or the circuit 250 (FIG. 2c). In order to open and close each switch structure 430, each switch structure 430 may have a control signal (not shown). As discussed previously, the control signal for each switch structure 430 may be an external signal or it may be logically generated based upon the state of internal signals.

To support the coupling and decoupling of the output of any power domain power supply to any combination of outputs of the remaining power domain power supplies, each output may need to be connected to each of the remaining outputs via a switch structure. For example, output "PDXO 1" 405 can be connected to outputs "PDXO 2" 410, "PDXO 3" 415, and "PDXO 4" 420 by switching structures. A mapping of the switch structures 430 can be used to specify the coupling of the outputs. For example, to couple outputs "PDXO 1" 405 to "PDXO 4" 420 and outputs "PDXO 2" 410 to "PDXO 3" 415, the mapping of the switch structures 430 may specify that the switch structure between "PDXO 1" 405 and "PDXO 4" 420 be closed and the switch structure between "PDXO 2" 410 to "PDXO 3" 415 be closed while all remaining switch structures be open.

Figure 4B:
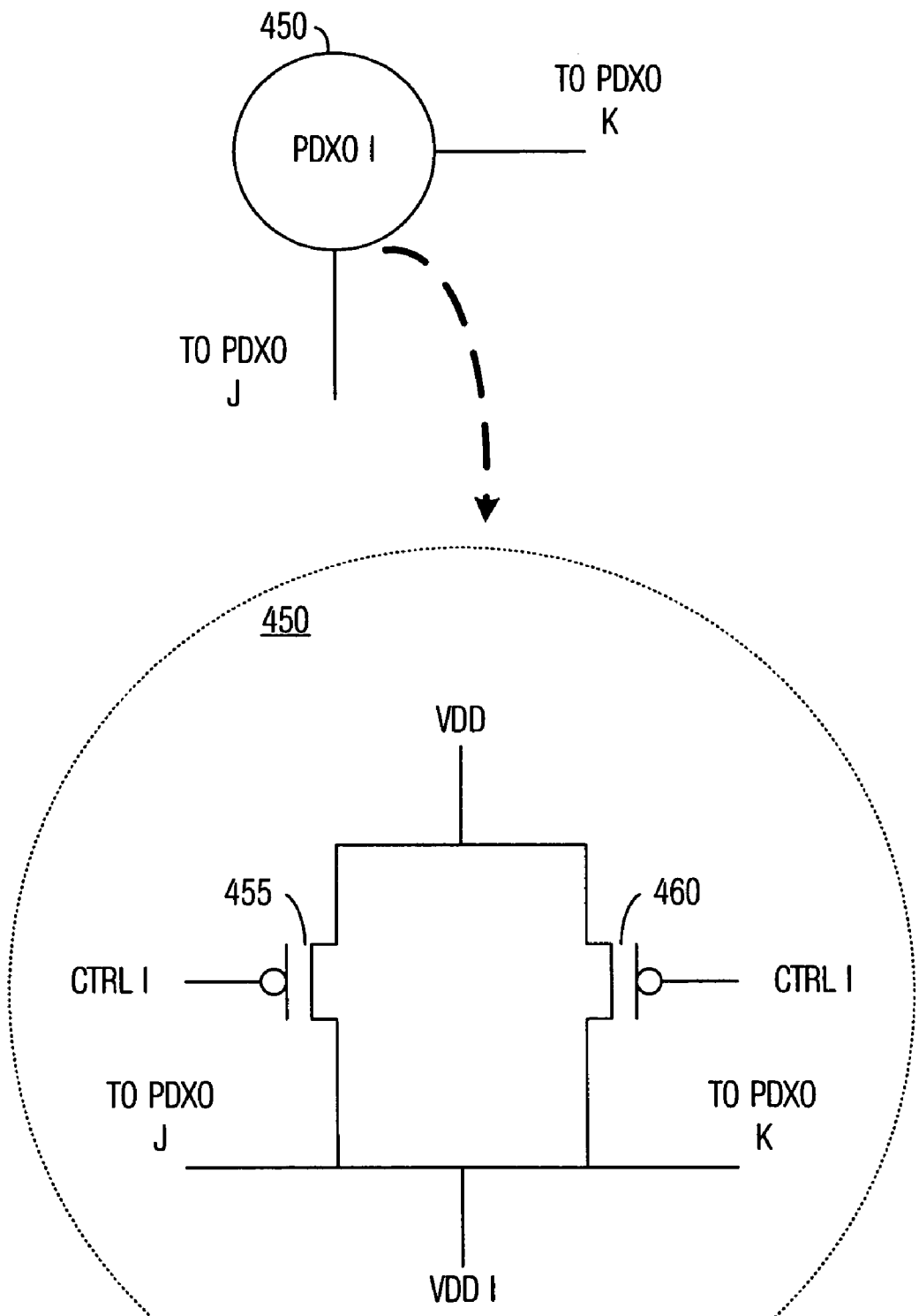
FIG. 4b is a diagram of a power supply for a power domain, according to a preferred embodiment of the present invention.

With reference now to FIG. 4b, there is shown a diagram illustrating a power supply 450 for a power domain, according to a preferred embodiment of the present invention. The power supply 450 for a power domain, as illustrated in FIG. 4b, may be used to provide a desired voltage at a desired current level. For example, the power supply 450 may be one of the four power domain power supplies 405, 410, 415, or 420 shown in FIG. 4a. The power supply 450 may be implemented as a power source "VDD" that can be selectively coupled to circuitry sharing the power domain by a pair of transistors 455 and 460. According to a preferred embodiment of the present invention, the transistors 455 and 460 are P-type transistors. However, the use of N-type transistors is not precluded. The transistors 455 and 460 can be switched on (conducting) or off (non-conducting) by a control signal line "CTRL I." When the transistors 455 and 460 are switched on, power can be provided to the circuitry coupled to the power supply 450.

Figure 5A:
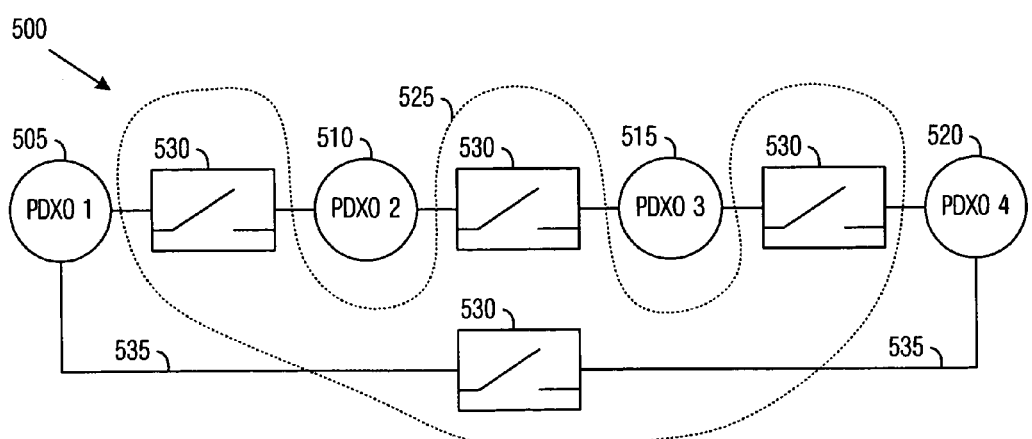
FIG. 5a is a diagram of a switching network for four power domain (or power sub-domain) power supplies, wherein the four power domain power supplies can be partially connected, according to a preferred embodiment of the present invention.

With reference now to FIG. 5a, there is shown a diagram illustrating a switch network 525 for four power domain (or power sub-domain) power supplies, wherein the four power domain power supplies can be partially connected, according to a preferred embodiment of the present invention. The switch network 525 can be used to couple outputs from the four power domain power sources (displayed in FIG. 5a as "PDXO 1" 505, "PDXO 2" 510, "PDXO 3" 515, and "PDXO 4" 520). The switch network 525 may be an example of the switch network 320 (FIG. 3) for a situation wherein there are four power domain power supplies. As illustrated in FIG. 5, the switch network 525 may permit the coupling of an output of a power domain power supply to some of outputs of the remaining power domain power supplies. For example, output "PDXO 1" 505 may be coupled to output "PDXO 2" 510 and/or output "PDXO 4" 520 and/or all other outputs, but not to output "PDXO 3" 515 (with exception of the case when all outputs are coupled together). As in the switch network 425 (FIG. 4a), the switch network 525 may be constructed out of a plurality of switch structures 530, wherein each switch structure 530 may be similar in design to the circuit 200 (FIG. 2a) or the circuit 250 (FIG. 2c).

Note that the order of the outputs of the power domain power supplies, i.e., output "PDXO 1" 505 followed by output "PDXO 2" 510 and so forth, as displayed in FIG. 5a are for illustrative purposes and the order can be arranged according to need. Furthermore, the outputs of the power domain power supplies are displayed as being arranged in a circular manner. However, it is possible to break the circular arrangement by eliminating link 535 and the switch network and creating a linear arrangement, for example.

Figure 5B:
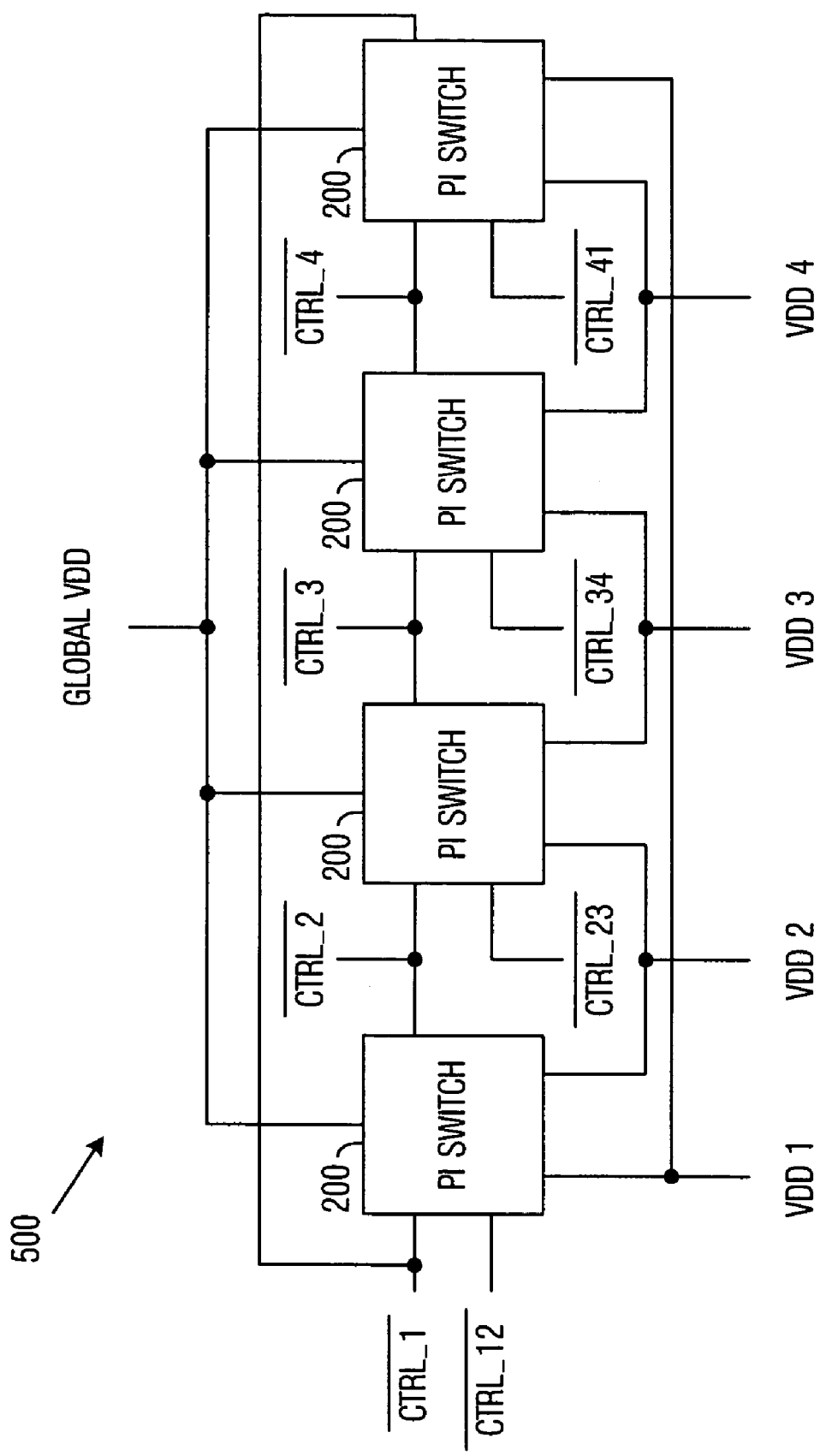
FIG. 5b is a diagram of a possible layout of the four power domain power supply with switching network displayed in FIG. 5a, according to a preferred embodiment of the present invention.

With reference now to FIG. 5b, there is shown a diagram illustrating a possible layout for the four power domain power supply 500 with switching network displayed in FIG. 5a, according to a preferred embodiment of the present invention. The four power domain power supply 500 features a switching network 525 (FIG. 5a) implemented using the circuit 200 and is displayed in its logical representation, a pi switch (displayed in FIG. 2b). Note that the switching network 525 is shown sharing a common voltage supply (VDD). However, the switching network 525 can operation equally effectively if each circuit 200 has an independent voltage supply, such as the circuit 250 shown in FIG. 2c and 2d.

Figure 6:
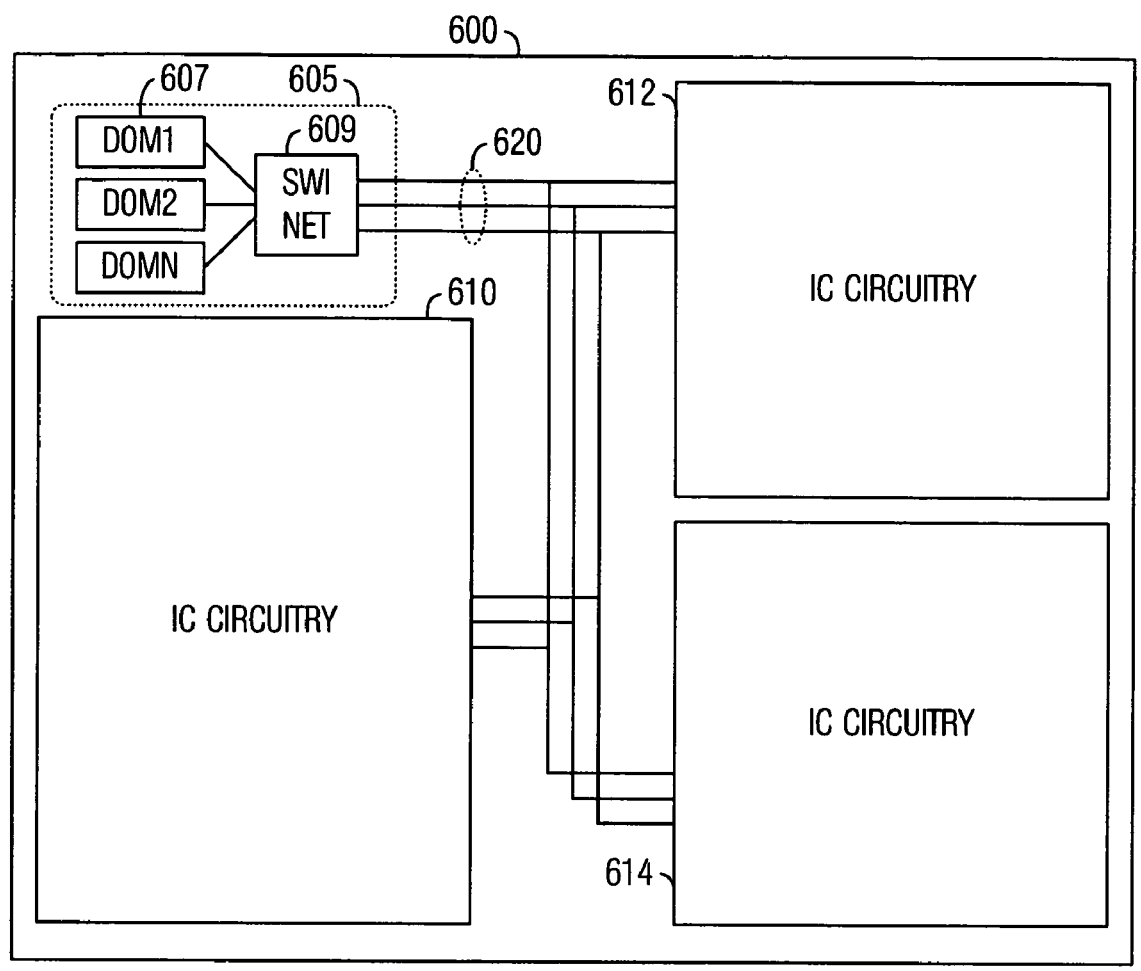
FIG. 6 is a diagram of an integrated circuit with a power supply providing power to different circuits in the integrated circuit via a plurality of power domains (and power sub-domains) with reduced voltage fluctuations, according to a preferred embodiment of the present invention.

With reference now to FIG. 6, there is shown a diagram illustrating an integrated circuit 600 with a power supply 605 providing power to different circuits in the integrated circuit 600 via a plurality of power domains (and power sub-domains) with reduced voltage fluctuations, according to a preferred embodiment of the present invention. The circuitry in the integrated circuit 600 may consist of multiple different circuits that may be partitioned into different portions. As displayed in FIG. 6, the circuitry in the integrated circuit 600 can be partitioned into three distinct parts, circuitry blocks 610, 612, and 614. A single circuitry block, for example, circuitry block 610, may be part of a single power domain or it may contain several power domains. The power supply 605 can provide power for N different power domains, for example, power domain 607. The power produced by the power supply 605 can be provided to the circuitry blocks via a power distribution network 620, which may be made up of conductive wires.

As discussed previously, a switching network 609 may be used to provide needed voltage levels with reduced voltage fluctuation. Note that the design of the switching network 610 may vary depending upon the number of power domains (and power sub-domains) to be used in the integrated circuit 600 and the degree of flexibility desired.

In an integrated circuit with large power requirements, it can be common to partition the power supply to the circuitry on the integrated circuit into multiple portions that can be placed at different parts of the integrated circuit. The partitioning can permit the use of multiple small power supplies which can be easier to integrate when compared to a single large power supply. Additionally, the multiple power supplies on the integrated circuit can provide a more consistent voltage level with less fluctuation.

Figure 7:
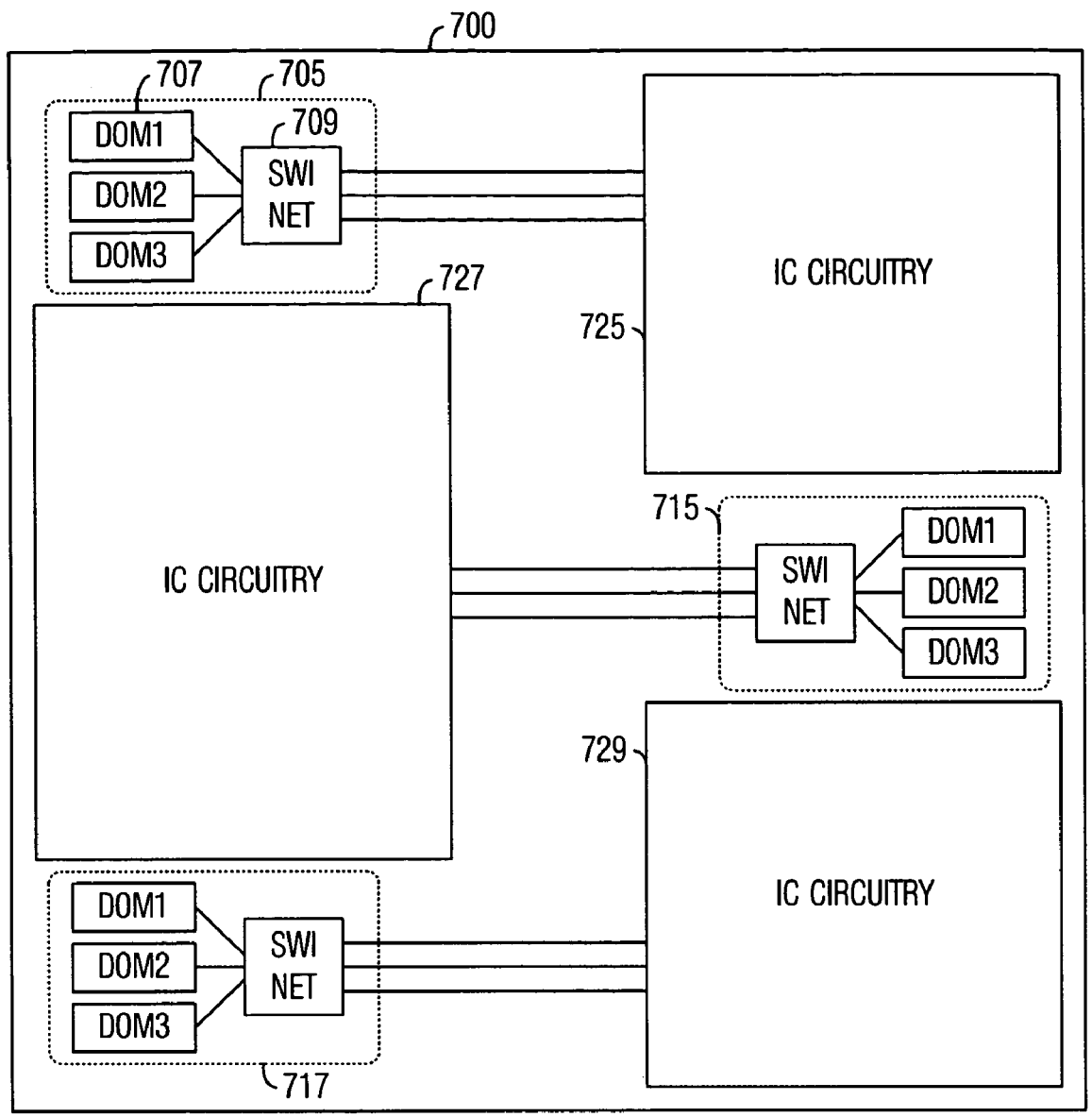
FIG. 7 is a diagram of an integrated circuit with a distributed power supply, wherein the distributed power supply can be capable of providing power to different circuits in the integrated circuit via a plurality of power domains (and power sub-domains) with reduced voltage fluctuations, according to a preferred embodiment of the present invention.

With reference now to FIG. 7, there is shown a diagram illustrating an integrated circuit 700 with a distributed power supply, wherein the distributed power supply can be capable of providing power to different circuits in the integrated circuit 700 via a plurality of power domains (and power sub-domains) with reduced voltage fluctuations, according to a preferred embodiment of the present invention. The circuitry in the integrated circuit 700 may consist of multiple different circuits that may be partitioned into different portions, such as circuitry blocks 725, 727, and 729. The distributed power supply may itself be partitioned into multiple parts, such as power supply parts 705, 715, and 717. As discussed above, the partitioning of the power supply can make it easier to integrate the power supply into the integrated circuit 700 as well as provide a more consistent and clean power source for the integrated circuit 700.

Each of the parts of the power supply, such as power supply part 705, may be similarly designed. The power supply part 705 may include power sources for each power domain (and power sub-domain), for example, a power source for power domain 1 707. Outputs from the power sources may be coupled to a switch network 709. The switch network 709 can couple the outputs from power sources to the power domains and couple power domains (and power sub-domains) with the same voltage requirements together to reduce voltage fluctuations. According to a preferred embodiment of the present invention, each part of the power supply can feature a switch network, such as the switch network 709, of the same design. By using the same design for the switching network in each part of the power supply, each circuitry block in the integrated circuit 700 can receive the same power. Alternatively, each part of the power supply can feature a switch network with a unique design (configuration). By using a different design (configuration) for the switch network located each part of the power supply, the power being delivered to a circuitry block can be customized to the needs of the circuitry block.

With reference now to FIG. 8, there is shown a data plot illustrating switching on current, showing current spike reduction with use of the switching structure, according to a preferred embodiment of the present invention. The information displayed in FIG. 8 was measured using simulation techniques with 0.13 μm target technology. A first curve 805 illustrates the switching-on current using a prior art switch structure, such as one displayed in FIG. 1. A second curve 810 illustrates the switching-on current using a switching structure (such as the switching structure 215 (FIG. 2)) and a third curve 815 illustrates the switching-on current using the switching structure 215 (same as the switching structure used in obtaining the results shown as the second curve 810), but with a smaller load. Comparing the first curve 805 and the second curve 810, it can be seen that the use of the switching structure 215 can reduce the magnitude of the switching-on current spike over a similar circuit with a prior art switching structure. Comparing the second curve 810 and the third curve 815, it can be seen that the current spike reduction can be enhanced at lower loads.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
   at least one global supply, to provide input power to the circuit;
   M voltage sources to provide output power from the circuit, wherein M is an integer number of at least two (2);
   a switching network having M terminals, wherein each terminal is coupled to one of the M voltage sources;
   the switching network containing N switch structure circuitries to electrically couple the at least one global supply to the M terminals, wherein N is an integer of at least one (1);
   each of the N switch structure circuitries containing a first and a second switch to couple the at least one global supply to a first and a second of the M terminals, respectively; and
   each of the N switch structure circuitries further containing a third switch to electrically connect pairs of the M terminals, wherein the connection of pairs of the terminals is based on a mapping selected from the group consisting of connecting pairs of all of the outputs together, connecting at least two of the outputs together, predeterminately connection at least two of the outputs together, and dynamically determinately connecting at least two of the outputs together.

2. The circuit of claim 1, wherein some of the voltage sources produce outputs with the same voltage potential.

3. The circuit of claim 2, wherein the outputs of voltage sources coupled together all have the same voltage potential.

4. The circuit of claim 2, wherein outputs of voltage sources with different voltage potentials are not connected by switches.

5. The circuit of claim 1, wherein the mapping is stored in a memory.

6. The circuit of claim 1, wherein the mapping is dynamically computed.

7. The circuit of claim 1, wherein the mapping specifies the state of each switch in the switching network.

8. The circuit of claim 1, wherein each output is connected to two other outputs via a switch.

9. The circuit of claim 8, wherein the outputs are connected in a circular fashion.

10. The circuit of claim 1, wherein the M voltage sources supply power to M power domains.

11. The circuit of claim 1, wherein the M voltage sources supply power to M power sub-domains within a single power domain.

12. The circuit of claim 1, wherein the switches are each a transistor; wherein a first terminal is the transistor's source, a second terminal is the transistor's drain, and a control signal line is coupled to the transistor's gate.

13. An integrated circuit comprising:
a circuitry block; and
a plurality of power supplies, each coupled to the circuitry block, each power supply comprising:
M voltage sources, wherein M is an integer number greater than one (1);
a switching network having M terminals, wherein each terminal is coupled to an output from one of the M voltage sources, the switching network containing switch circuitry to electrically connect rairs of the outputs of the M voltage sources, and the switching network further containing a voltage switch between each of the M voltage sources and a selected power supply.

14. The integrated circuit of claim 13, wherein the circuitry block comprises a plurality of circuit blocks, and wherein there is at least one power supply associated with each circuit block.

15. The integrated circuit of claim 14, wherein all power supplies are identical.

16. The integrated circuit of claim 14, wherein each power supply may be designed differently.

17. The integrated circuit of claim 14, wherein each circuit block and its associated power supply are located adjacent to one another on the integrated circuit.

18. A circuit comprising:
at least two power domains;
at least two voltage sources;
a switching structure having a first switch coupled between a first of the at least two voltage sources and a first of the of the at least two power domains, and a second switch coupled between one of the at least two voltage sources and a second of the at least two power domains, and a third switch connected between two of the at least two power domains; and
the first, second and third switches operable to activate electrical coupling based on values of a first, second and third control signal line.

19. The circuit of claim 18, wherein the third control signal line is logically derived from the first and second control signal lines.

20. The circuit of claim 18, wherein the first, second and third switches each comprise a MOSFET (metal oxide semiconductor field effect transistor), a first, second and third MOSFET, respectively.

21. The circuit of claim 20, wherein the MOSFETs have thick oxide to provide low-leakage characteristics.

22. The circuit of claim 20, wherein the width of the first and second MOSFETs are approximately equal and the width of the third MOSFET between the at least two power domains is on the order of 10 to 20 percent the width of the first and second MOSFETs.

23. The circuit of claim 18, wherein the first, second and third switches each comprise a Ptype MOSFET (metal oxide semiconductor field effect transistor).

24. The circuit of claim 18, wherein the second switch is coupled between the first of the at least two voltage sources and a second of the at least two power domains.

25. The circuit of claim 24, wherein the first, second and third switches each comprise a Ptype MOSFET (metal oxide semiconductor field effect transistor).

* * * * *